US008879015B2

(12) United States Patent
Yoshida et al.

(10) Patent No.: US 8,879,015 B2
(45) Date of Patent: Nov. 4, 2014

(54) LIQUID CRYSTAL DISPLAY DEVICE HAVING A SWITCH DEVICE CONNECTED TO A SHIELD ELECTRODE AND AN INTERCONNECTION AND ELECTRONIC APPARATUS

(75) Inventors: Shuhei Yoshida, Tottori (JP); Joji Nishimura, Matsumoto (JP); Yukiya Hirabayashi, Suwa (JP); Hideki Uehara, Tottori (JP)

(73) Assignee: Japan Display West Inc., Aichi-Ken (JP)

( * ) Notice: Subject to any disclaimer, the term of this patent is extended or adjusted under 35 U.S.C. 154(b) by 1293 days.

(21) Appl. No.: 12/634,243

(22) Filed: Dec. 9, 2009

(65) Prior Publication Data

US 2010/0171896 A1 Jul. 8, 2010

(30) Foreign Application Priority Data

Jan. 5, 2009 (JP) ................................. 2009-000061

(51) Int. Cl.
*G02F 1/136* (2006.01)
*G02F 1/1333* (2006.01)
*G02F 1/1345* (2006.01)
*G09G 3/36* (2006.01)
*G02F 1/1362* (2006.01)

(52) U.S. Cl.
CPC ............ *G02F 1/1345* (2013.01); *G09G 3/3614* (2013.01); *G02F 2001/136218* (2013.01); *G09G 3/3655* (2013.01); *G09G 2330/04* (2013.01)
USPC ................... 349/48; 349/50; 349/43; 349/54; 257/532

(58) Field of Classification Search
CPC ............... G02F 2001/136218; G02F 1/136209
USPC ......................... 349/43, 48, 50, 54; 257/532
See application file for complete search history.

(56) References Cited

U.S. PATENT DOCUMENTS 4,547,042 A * 10/1985 Ngo .............................. 349/143
6,005,543 A * 12/1999 Kimura ........................... 345/94

(Continued)

FOREIGN PATENT DOCUMENTS

JP 2001-051263 2/2001
JP A-2001-051263 2/2001

(Continued)

OTHER PUBLICATIONS

Notice of reasons for refusal issued in connection with Japanese Patent Application No. 2009-000061, dated Dec. 18, 2012. (4 pages).

*Primary Examiner* — Huyen Ngo
(74) *Attorney, Agent, or Firm* — K&L Gates LLP

(57) ABSTRACT

A liquid crystal display device includes a first substrate, a first thin film transistor formed on the first substrate, a pixel electrode and a common electrode formed above the first thin film transistor of the first substrate, a liquid crystal layer formed above the pixel electrode and the common electrode, a second substrate provided above the pixel electrode and the common electrode via the liquid crystal layer, a shield electrode formed on a substantially entire surface of the liquid crystal layer side of the second substrate, a switch device being electrically connected to the shield electrode and the interconnection, wherein the switch device is turned on when a potential of the shield electrode is larger than the specific potential of the interconnection and a difference between the potential of the shield electrode and the specific potential of the interconnection is larger than predetermined potential.

10 Claims, 7 Drawing Sheets

(56) References Cited

U.S. PATENT DOCUMENTS

| | | | |
|---|---|---|---|
| 2001/0035919 A1* | 11/2001 | Zhang | 349/44 |
| 2006/0192288 A1* | 8/2006 | Ueno | 257/758 |
| 2006/0237819 A1* | 10/2006 | Kikuta et al. | 257/532 |
| 2006/0256249 A1* | 11/2006 | Nagano et al. | 349/43 |

FOREIGN PATENT DOCUMENTS

| | | |
|---|---|---|
| JP | 2002-118957 | 4/2002 |
| JP | 2004-151583 | 5/2004 |
| JP | 2007-310334 | 11/2007 |
| JP | 2008-129405 | 6/2008 |

* cited by examiner

LIQUID CRYSTAL DISPLAY DEVICE HAVING A SWITCH DEVICE CONNECTED TO A SHIELD ELECTRODE AND AN INTERCONNECTION AND ELECTRONIC APPARATUS

This application claims the benefit of Japanese Patent Application No. 2009-000061, field on Jan. 5, 2009. The entire disclosures of the prior applications are hereby incorporated by reference herein in their entirety.

BACKGROUND

1. Technical Field

The present invention relates to a liquid crystal display device and an electronic apparatus, and, more particularly, to a liquid crystal display device provided with a shield electrode formed on one of a pair of substrates thereof and an electronic apparatus.

2. Related Art

According to the related art, a liquid crystal display device provided with a shield electrode formed on one of a pair of substrates is disclosed (see JP-A-2001-51263). According to the liquid crystal display device disclosed in JP-A-2001-51263, the shield electrode is formed on one of the substrates, and a pixel electrode and a common electrode are formed on the other one of the substrates. Further, the liquid crystal display device is driven using an IPS (In Plane Switching) method in which liquid crystals are driven by a transverse electric field generated between the pixel electrode and the common electrode. In addition, the shield electrode (conductive layer) provided in the liquid crystal display device is connected to a predetermined potential (a ground potential, a common electrode potential or the like), or the shield electrode is in a floating state.

However, according to the liquid crystal display device disclosed in JP-A-2001-51263, when the shield electrode is connected to a specific potential (ground potential, common electrode potential or the like), the specific potential of the shield electrode exerts influence upon a pixel, so that transmittance may be reduced as compared with the case in which the shield electrode is in the floating state. Meanwhile, in the case in which the shield electrode is in the floating state, static electricity accumulated on the shield electrode may not be easily discharged, and light may be leaked during the black display. As described above, in the liquid crystal display device disclosed in JP-A-2001-51263, display defects may occur due to the influence of the potential of the shield electrode.

SUMMARY

An advantage of some aspects of the invention is to provide a liquid crystal display device and an electronic apparatus, capable of preventing display defects from being caused by the influence of the potential of a shield electrode.

According to a first aspect of the invention, there is provided a liquid crystal display device including a first substrate, a first thin film transistor for pixel selection formed on the first substrate, a pixel electrode and a common electrode formed above the first thin film transistor of the first substrate, a second substrate provided above the pixel electrode and the common electrode via a liquid crystal layer, a shield electrode formed on a surface of the second substrate, and the shield electrode and an interconnection, which supplies specific AC or DC potential, and is turned on by potential larger than predetermined potential.

In the liquid crystal display device according to the first aspect of the invention, as described above, since the switch device is formed between the shield electrode and the specific AC or DC potential and is turned on by the potential larger than the predetermined potential, the shield electrode is not affected by the specific potential when the potential of the shield electrode is smaller than the predetermined potential, differently from the case in which the shield electrode is directly connected to the interconnection that supplies the specific potential. Thus, the display defect can be prevented from being caused by the influence of the specific potential, which is applied to the shield electrode, to the pixel. Further, the switch device is turned on by the potential larger than the predetermined potential, so that static electricity of the predetermined potential or more is prevented from being accumulated on the shield electrode. Consequently, as compared with the case in which static electricity accumulated on the shield electrode is not discharged, the display defect can be prevented from being caused by the influence of the static electricity accumulated on the shield electrode.

In the liquid crystal display device according to the first aspect of the invention, preferably, the interconnection that supplies the specific potential is an interconnection that supplies the common potential to the common electrode. According to this configuration, since the common potential supplied to the common electrode is originally provided to the liquid crystal display device, the switch device can be easily connected to the specific potential, differently from the case of providing additional potential.

In the liquid crystal display device according to the first aspect of the invention, preferably, the shield electrode is formed on the second substrate facing the first substrate. According to this configuration, the shield electrode can be easily connected to the device formed on the first substrate, differently from the case in which the shield electrode is formed on an opposite side of the second substrate with respect to the first substrate.

In the liquid crystal display device according to the first aspect of the invention, preferably, the switch device includes a second thin film transistor having an active layer the same as an active layer of the first thin film transistor. According to this configuration, differently from the case in which the active layer of the second thin film transistor is formed separately from the active layer of the first thin film transistor, since the first thin film transistor and the second thin film transistor can be formed using the same process, the second thin film transistor can be easily formed.

In such a case, preferably, one of a source and a drain of the second thin film transistor is electrically conductive with the shield electrode, and at least one of the source and the drain of the second thin film transistor is connected to a gate of the second thin film transistor. According to this configuration, charges accumulated on the shield electrode can be easily discharged to the other one of the source and the drain of the second thin film transistor.

In the liquid crystal display device in which at least one of the source and the drain of the second thin film transistor is connected to the gate, preferably, the other one of the source and the drain of the second thin film transistor is connected to the gate of the second thin film transistor. According to this configuration, although the potential of the shield electrode is lower than the potential of the other one of the source and the drain of the second thin film transistor, potential can be supplied to the shield electrode from the other one of the source and the drain of the second thin film transistor.

Preferably, the liquid crystal display device according to the first aspect of the invention further includes a conducting section provided between the shield electrode and a first end of the switch device. The first end of the switch device is connected to the conducting section, and a second end of the switch device is connected to the interconnection which supplies the specific potential. According to this configuration, charges accumulated on the shield electrode can be easily discharged to the specific potential via the conducting section.

In the liquid crystal display device according to the first aspect of the invention, preferably, the first substrate has a display area provided with a plurality of pixels and a non-display area other than the display area, and the switch device is provided in the non-display area. According to this configuration, differently from the case in which the switch device is provided in the display area, contribution to the display of the display area can be prevented from being reduced.

Preferably, the liquid crystal display device according to the first aspect of the invention further includes a seal member that seals the first and second substrates such that the liquid crystal layer is interposed between the first and second substrates, and the switch device overlaps the seal member when seen in plan view. According to this configuration, since the space dedicated for the switch device does not need to be provided, so that an outer area (i.e., a frame area) of the seal member does not need to be widened. Thus, the total size of a liquid crystal panel can be prevented from being increased, so that the liquid crystal display device can be fabricated in a micro size.

In such a case, preferably, the liquid crystal display device further includes a conducting section provided between the shield electrode and a first end of the switch device, and an interconnection layer that connects the conducting section to the first end of the switch device. The conducting section and the interconnection layer overlap the seal member when seen in plan view. According to this configuration, the space dedicated for the conducting section and the interconnection layer does not need to be provided, so that the outer area (i.e., the frame area) of the seal member does not need to be widened. Thus, the total size of a liquid crystal panel can be prevented from being increased, so that the liquid crystal display device can be fabricated in a micro size.

In the liquid crystal display device according to the first aspect of the invention, preferably, the switch device is provided in a plural number, and the plural switch devices are serially or parallelly connected to each other. According to this configuration, although one of the switch devices does not normally operate, charges accumulated on the shield electrode can be discharged to the specific potential via another switch device.

An electronic apparatus according to a second aspect of the invention includes the liquid crystal display device having the above configuration. According to this configuration, it is possible to obtain the electronic apparatus capable of preventing the display defect from being caused by the influence of the potential of the shield electrode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

Figure 1:
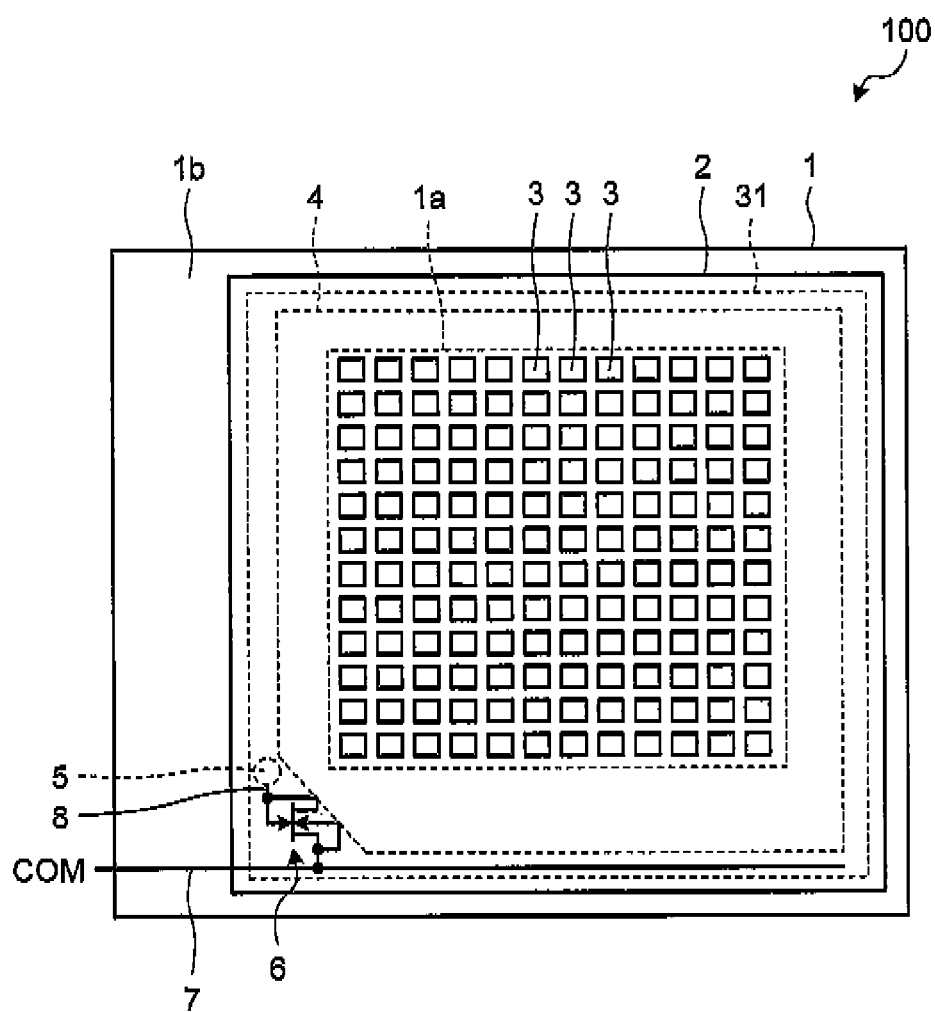
FIG. 1 is a plan view showing a liquid crystal display device according to one embodiment of the invention.
Figure 2:
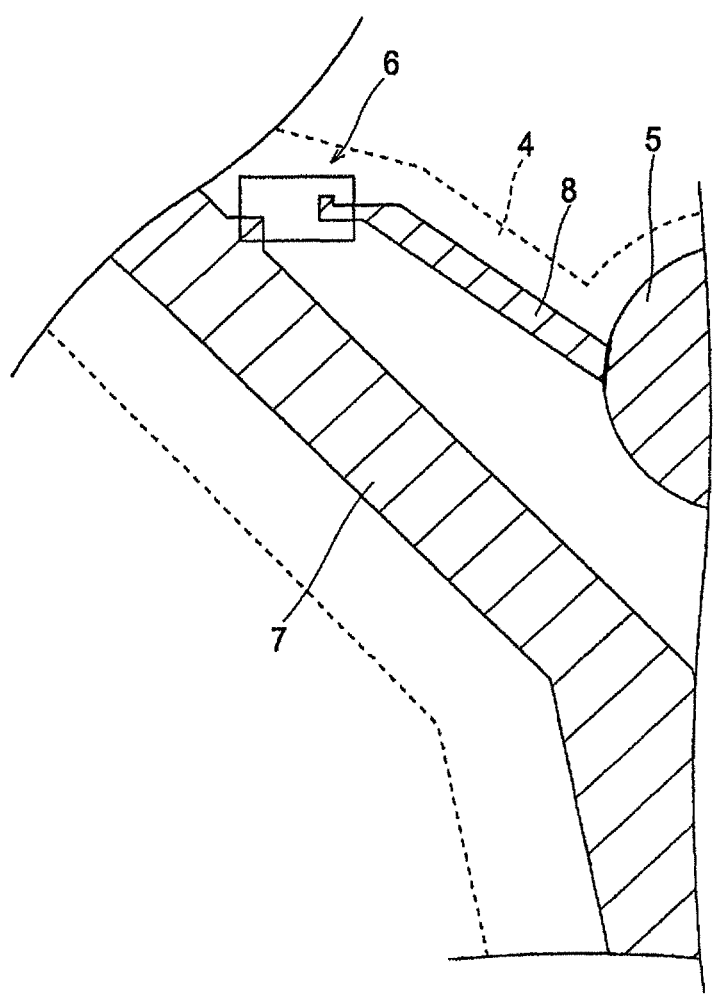
FIG. 2 is a plan view showing a common electrode interconnection, a thin film transistor serving as a diode, and a conducting section of a liquid crystal display device according to one embodiment of the invention.

FIG. 1 is a plan view showing a liquid crystal display device according to one embodiment of the invention. FIG. 2 is a plan view showing a common electrode interconnection, a thin film transistor serving as a diode, and a conducting section of the liquid crystal display device according to one embodiment of the invention. FIGS. 3 to 7 are views showing the structure of the liquid crystal display device according to one embodiment of the invention. The configuration of the liquid crystal display device 100 according to one embodiment of the invention will be described with reference to FIGS. 1 to 7.

As shown in FIG. 1, the liquid crystal display device 100 according to one embodiment of the invention includes a pair of glass substrates 1 and 2, a plurality of pixels 3, a seal member 4 for encapsulating the pixels 3 (liquid crystal layer 36), a conducting section 5 included in the seal member 4, a thin film transistor 6 connected to the conducting section 5 to serve as a diode, and a common potential interconnection 7 connected to the thin film transistor 6. The substrates 1 and 2 are one example of a "first substrate" and a "second substrate" of the invention, respectively. Further, the thin film transistor 6 is one example of a "second thin film transistor" of the invention. Further, according to the embodiment, the common potential interconnection 7 is connected to common potential COM supplied to a common electrode 21 which will be described later. Furthermore, the liquid crystal display device 100 is configured to be driven by inversion driving in which the potential of the common potential is alternately inverted. The common potential is one example of the "specific potential" of the invention and the common potential interconnection 7 is one example of an "interconnection that supplies the specific potential" of the invention.

Further, according to the embodiment, the size of the substrate 2 is smaller than that of the substrate 1 when seen in plan view, and a display area 1a is provided on the substrate 1 on an overlap area between the substrates 1 and 2. Further, a non-display area 1b (portion other than the display area 1a) is formed to surround the periphery of the display area 1a. The pixels 3 are arranged on the display area 1a in a matrix type.

Further, according to the embodiment, as shown in FIG. 2, the thin film transistor 6 is disposed between the conducting section 5 and the common potential interconnection 7, and the conducting section 5 is connected to the thin film transistor 6 through an interconnection 8. The interconnection 8 is one example of an "interconnection" of the invention. Further, the interconnection 8 includes a metal layer the same as that of a gate electrode 11 of a thin film transistor 16 for pixel selection which will be described later. Further, according to the embodiment, the conducting section 5, the thin film transistor 6, the common potential interconnection 7 and the interconnection 8 overlap the seal member 4 on the non-display area 1b when seen in plan view. That is, when seen in plan view, the thin film transistor 6 may entirely overlap the seal member 4 or the thin film transistor 6 may partially overlap the seal member 4.

Figure 3:
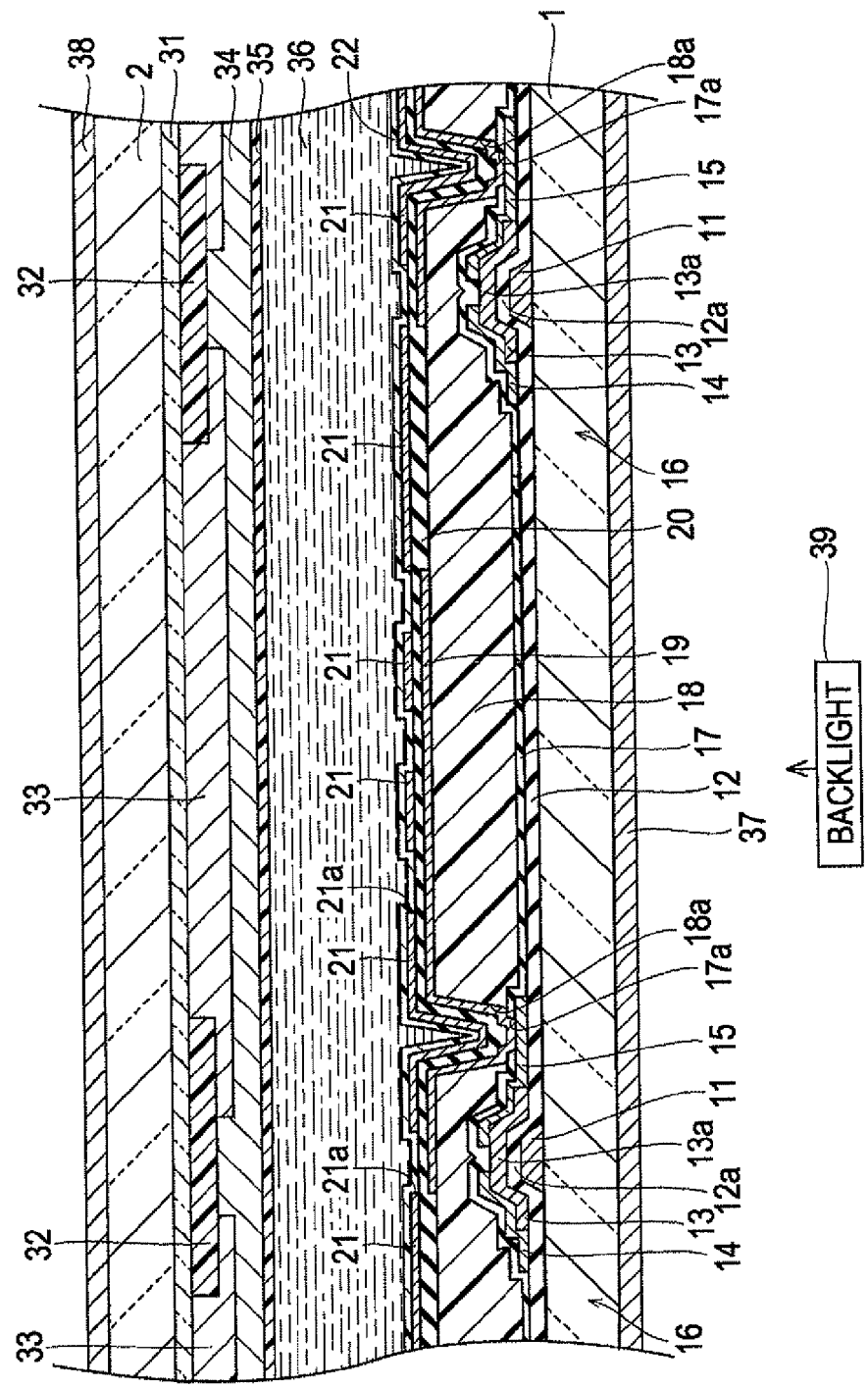
FIG. 3 is a sectional view showing a pixel of a liquid crystal display device according to one embodiment of the invention.

As shown in FIG. 3, according to the sectional structure of the pixel 3, the gate electrode 11 is formed on the substrate 1. Further, an insulating layer 12 including a gate insulating layer 12a made of a SiN layer or a SiO$_2$ layer is formed on the gate electrode 11 and the substrate 1. A semiconductor layer 13 having a dual layer structure with a lower a– Si layer and an upper n+ Si layer having n type conductivity is formed to overlap the gate electrode 11 via the gate insulating layer 12a when seen in plan view. That is, the semiconductor layer 13 is one example of an "active layer" of the invention.

A source electrode 14 and a drain electrode 15 are formed on the semiconductor layer 13 to overlap the gate electrode 11 and the semiconductor layer 13 when seen in plan view. Further, when seen in plan view, a channel region 13a is formed in an area of the semiconductor layer 13 interposed between the source electrode 14 and the drain electrode 15 when seen in plan view. The gate electrode 11, the semiconductor layer 13, the source electrode 14 and the drain electrode 15 constitute the thin film transistor 16 for the pixel selection. That is, the thin film transistor 16 is one example of a "first thin film transistor" of the invention.

An interlayer dielectric layer 17 including a SiN layer is formed to cover the source electrode 14, the drain electrode 15 and the insulating layer 12. Further, a contact hole 17a is formed in an area of the interlayer dielectric layer 17, which corresponds to the drain electrode 15. The interlayer dielectric layer 17 is formed on the surface thereof with a planar layer 18 including an organic layer made of acrylic-based resin or the like. Further, the planar layer 18 is formed with a contact hole 18a passing through the contact hole 17a. Further, a pixel electrode 19 including a transparent electrode made of ITO (Indium Tin Oxide) or the like is formed on the surface of the planar layer 18 to be connected to the drain electrode 15 via the contact hole 17a and the contact hole 18a. That is, the pixel electrode 19 is formed for each pixel 3.

Further, the planar layer 18 and the pixel electrode 19 are formed on the surface thereof with a passivation layer 20 including a SiN layer formed at the low temperature. A common electrode 21 including a transparent electrode made of ITO or the like is formed on the surface of the passivation layer 20 over the pixels 3. Further, the common electrode 21 is provided with a plurality of slits 21a, and an electric field is generated between the pixel electrode 19 and the common electrode 21 via the slits 21a.

In addition, the common electrode 21 is formed on the surface thereof with an alignment layer 22 including an organic layer made of polyimide or the like. The alignment layer 22 covers the surface of the common electrode 21 while making contact with the passivation layer 20 via the slits 21a of the common electrode 21.

According to the embodiment, a shield electrode 31 including a transparent electrode made of ITO or the like is formed on the surface 1 of the substrate 2 facing the substrate 1. The shield electrode 31 is substantially formed on the entire surface of the substrate 2. Further, the shield electrode 31 is formed on the surface thereof with black matrixes 32 made of resin or the like. When seen in plan view, the black matrix 32 is formed at the boundary of the pixel 3 in a matrix type. Further, the shield electrode 31 and the black matrixes 32 are formed on the surface thereof with color filters 33. In addition, the black matrixes 32 and the color filters 33 are formed on the surface thereof with an overcoat 34 serving as a protective layer. The overcoat 34 is formed on the surface thereof with an alignment layer 35 including an organic layer made of polyimide. The liquid crystal layer 36 is interposed between the alignment layer 22 and the alignment layer 35.

Further, a polarizing plate 37 is formed on an opposite surface of the substrate 1 with respect to the substrate 2, and a polarizing plate 38 is formed on an opposite surface of the substrate 2 with respect to the substrate 1. In addition, a backlight 39 is installed to face the polarizing plate 37.

Figure 4:
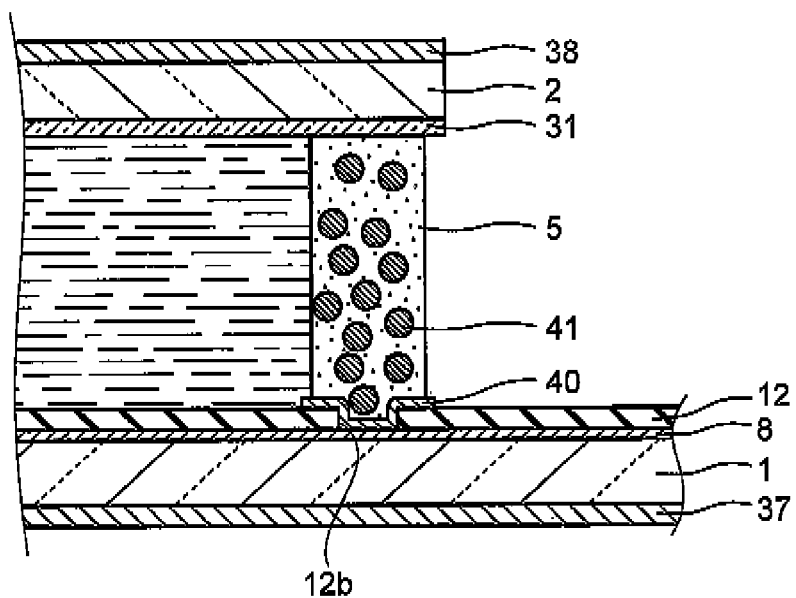
FIG. 4 is a sectional view showing the vicinity of an end portion of a display area of a liquid crystal display device according to one embodiment of the invention.

As shown in FIG. 4, the interconnection 8 having one end connected to the common electrode 21 and the other end connected to the thin film transistor 6 is provided on the surface of the substrate 1 which corresponds to the end portion of the substrate 2. The interconnection 8 is formed on the surface thereof with the insulating layer 12 including the SiN layer or the SiO$_2$ layer. Further, the insulating layer 12 is formed with the contact hole 12b, and an electrode 40 made of ITO is formed on the insulating layer 12 to make contact with the interconnection 8 through the contact hole 12b. In addition, according to the embodiment, particulate conductive materials 41 made of gold Au or the like are included in an area corresponding to the electrode 40 of the seal member 4, and the shield electrode 31 is electrically conductive with the interconnection 8 through the section (the conducting section 5) of the seal member 4 including conductive materials 41.

Figure 5:
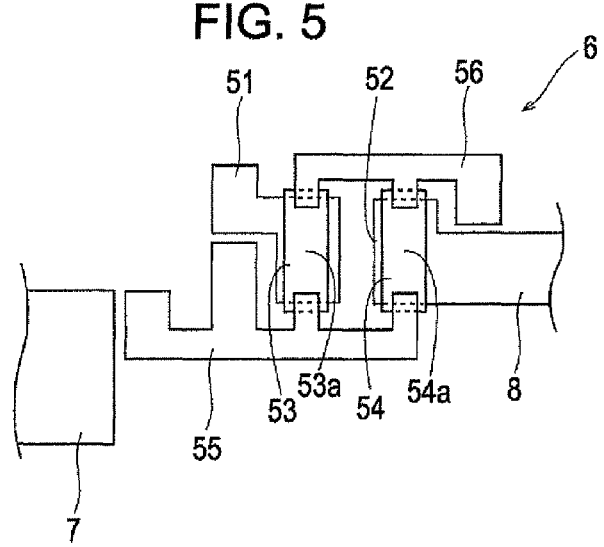
FIG. 5 is a plan view showing layers below a source electrode and a drain electrode of a thin film transistor serving as a diode in a liquid crystal display device according to one embodiment of the invention.

As shown in FIG. 5, according to the thin film transistor 6 serving as a diode, a gate electrode 51 and a gate electrode 52 are formed on the surface of the substrate 1. That is, the gate electrode 52 is connected to the interconnection 8 connected to the conducting section 5 (see FIG. 4) which is electrically conductive with the shield electrode 31. Further, the gate electrode 51 and the gate electrode 52 include a layer the same as that of the common potential interconnection 7.

Figure 7:
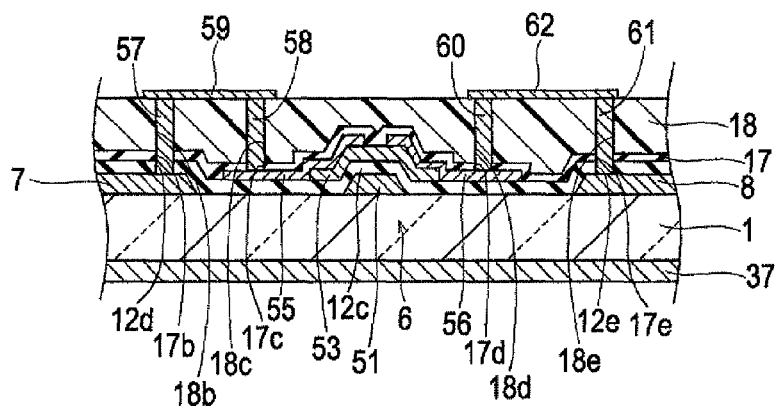
FIG. 7 is a sectional view taken along line VII-VII in FIG. 6.

As shown in FIG. 7, the insulating layer 12 including the SiN layer or the SiO$_2$ layer to serve as a gate insulating layer 12c of the thin film transistor 6 is formed on the surface of the gate electrode 51 (the gate electrode 52 not shown in FIG. 7), the interconnection 8 and the common potential interconnection 7. A contact hole 12d and a contact hole 12e are each formed in areas corresponding to the common potential interconnection 7 and the interconnection 8 of the insulating layer 12.

Figure 6:
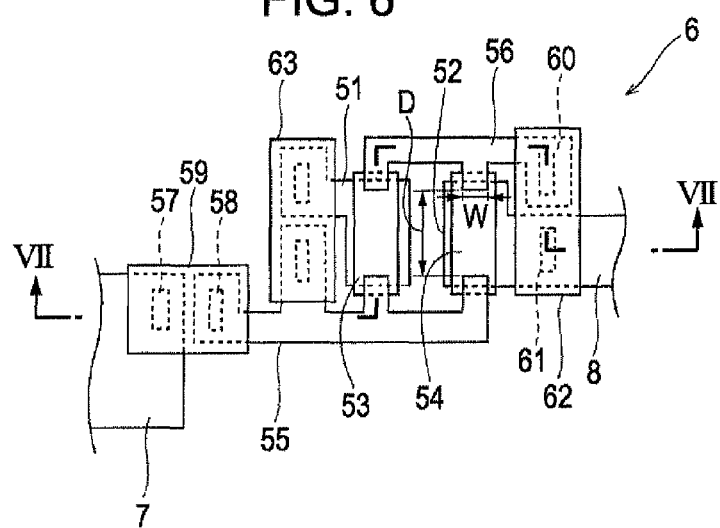
FIG. 6 is a plan view showing a thin film transistor serving as a diode in a liquid crystal display device according to one embodiment of the invention.

As shown in FIGS. 5 and 6, a semiconductor layer 53 (54) having a dual layer structure with a lower a– Si layer and an upper n+ Si layer having n type conductivity is formed to overlap the gate electrode 51 (52) via the gate insulating layer 12c when seen in plan view. That is, the semiconductor layer 53 (54) is one example of an "active layer" of the invention. A source electrode 55 and a drain electrode 56 are formed on the semiconductor layer 53 (54) to overlap the gate electrode 51 (52) and the semiconductor layer 53 (54) when seen in plan view. Further, when seen in plan view, a channel region 53a (54a) is formed in an area of the semiconductor layer 53 (54) interposed between the source electrode 55 and the drain electrode 56.

As shown in FIG. 7, the interlayer dielectric layer 17 including the SiN layer is formed to cover the source electrode 55, the drain electrode 56 and the insulating layer 12. Further, contact holes 17b to 17e each are formed in areas of the interlayer dielectric layer 17, which correspond to the common potential interconnection 7, the source electrode 55, the drain electrode 56 and the interconnection 8.

Further, the interlayer dielectric layer 17 is formed on the surface thereof with the planar layer 18, and contact holes 18b to 18e each are formed in areas of the planar layer 18, which correspond to the common potential interconnection 7, the source electrode 55, the drain electrode 56 and the interconnection 8.

Further, as shown in FIGS. 6 and 7, an electrode 59 including a transparent electrode is formed to connect the common potential interconnection 7 to the source electrode 55 via contact sections 57 and 58. In addition, an electrode 62 including a transparent electrode is formed to connect the drain electrode 56 to the interconnection 8 via contact sections 60 and 61.

According to the embodiment, as shown in FIG. 6, an electrode 63 including a transparent electrode is formed to connect the source electrode 55 to the gate electrode 51. Thus, the thin film transistor 6 serves as a diode in which the source electrode 55 is connected to the gate electrode 51. Further, according to the embodiment, the drain electrode 56 is connected to the interconnection 8 (the gate electrode 52) via the electrode 62, so that the thin film transistor 6 serves as a diode in which the drain electrode 56 is connected to the gate electrode 52. That is, the thin film transistor 6, for example, is configured so that the gate electrode 51 and the gate electrode 52 are turned on by a voltage of 10V. In other words, the 10V, by which the thin film transistor 6 is turned on, is one example of the "predetermined potential" of the invention.

Further, according to the embodiment, as shown in FIGS. 3 and 7, the gate electrode 11, the semiconductor layer 13, the source electrode 14 and the drain electrode 15 of the thin film transistor 16 for the pixel selection include the same layers as those of the gate electrode 51 (52), the semiconductor layer 53 (54), the source electrode 55 and the drain electrode 56 of the thin film transistor 6 serving as the diode.

Further, as shown in FIG. 6, the channel widths W of the channel regions 53a and 54a of the thin film transistor 6 serving as the diode are substantially identical to the channel width of the channel region 13a of the thin film transistor 16 for the pixel selection. Further, the channel lengths D of the channel regions 53a and 54a of the thin film transistor 6 serving as the diode are five times to ten times as long as the channel length of the channel region 13a of the thin film transistor 16 for the pixel selection. Thus, the resistance of the channel regions 53a and 54a of the thin film transistor 6 serving as the diode is larger than the resistance of the channel region 13a of the thin film transistor 16 for the pixel selection.

According to the embodiment, as described above, since the thin film transistor 6, which is turned on by potential larger than the predetermined potential (10V) to serve as the diode, is provided between the shield electrode 31 and the common potential interconnection 7, the shield electrode 31 is not affected by the common potential when the potential of the shield electrode 31 is smaller than the predetermined potential, differently from the case in which the shield electrode 31 is directly connected to the common potential interconnection 7. Thus, the display defect can be prevented from being caused by the influence of the common potential, which is applied to the shield electrode 31, to the pixel 3. Further, the thin film transistor 6 is turned on by the potential larger than the predetermined potential, so that the static electricity of the predetermined potential or more is prevented from being accumulated on the shield electrode 31. Consequently, as compared with the case in which static electricity accumulated on the shield electrode 31 is not discharged, the display defect can be prevented from being caused by the influence of the static electricity accumulated on the shield electrode 31.

Further, according to the embodiment, as described above, the common potential interconnection 7 that supplies the common potential is connected to the shield electrode 31 via the thin film transistor 6, so that potential can be easily connected to the shield electrode 31 via the thin film transistor 6 because the common potential is originally provided to the liquid crystal display device 100, differently from the case of providing additional potential.

Further, according to the embodiment, as described above, the shield electrode 31 is formed on the substrate 2 facing the substrate 1, so that the shield electrode 31 can be easily connected to the thin film transistor 6, differently from the case in which the shield electrode 31 is formed on an opposite side of the substrate 2 with respect to the substrate 1.

Further, according to the embodiment, as described above, the gate electrode 51 (52), the semiconductor layer 53 (54), the source electrode 55 and the drain electrode 56 of the thin film transistor 6 serving as the diode include the same layers as those of the gate electrode 11, the semiconductor layer 13, the source electrode 14 and the drain electrode 15 of the thin film transistor 16 for the pixel selection, so that the thin film transistor 6 and the thin film transistor 16 can be easily formed because the thin film transistor 6 and the thin film transistor 16 are formed through the same process.

Further, according to the embodiment, as described above, the drain electrode 56 of the thin film transistor 6 is electrically conductive with the shield electrode 31, and the drain electrode 56 of the thin film transistor 6 is connected to the gate electrode 52 of the thin film transistor 6, so that charges accumulated on the shield electrode 31 can be discharged to the source electrode 55 of the thin film transistor 6.

Further, according to the embodiment, as described above, the source electrode 55 of the thin film transistor 6 is connected to the gate electrode 51 of the thin film transistor 6, so that potential can be supplied to the shield electrode 31 from the common potential although the potential of the shield electrode 31 is lower than the common potential.

Further, according to the embodiment, as described above, the drain electrode 56 of the thin film transistor 6 is connected to the conducting section 5, and the source electrode 55 of the thin film transistor 6 is connected to the common potential interconnection 7, so that the charges accumulated on the shield electrode 31 can be easily discharged to the common potential via the conducting section 5.

Further, according to the embodiment, as described above, the thin film transistor 6 is provided in the non-display area 1b, so that contribution to the display of the display area 1a can be prevented from being reduced, differently from the case in which the thin film transistor 6 is provided in the display area 1a.

Further, according to the embodiment, as described above, since the thin film transistor 6 is configured to overlap the seal member 4 when seen in plan view, the space dedicated for the thin film transistor 6 does not need to be provided, so that an outer area (i.e., a frame area) of the seal member 4 does not need to be widened. Thus, the total size of a liquid crystal panel can be prevented from being increased, so that the liquid crystal display device 100 can be fabricated in a micro size.

Further, according to the embodiment, as described above, since the conducting section 5 and the interconnection 8 are configured to overlap the seal member 4 when seen in plan view, the space dedicated for the conducting section 5 and the interconnection 8 does not need to be provided, so that the outer area (i.e., the frame area) of the seal member 4 does not need to be widened. Thus, the total size of a liquid crystal panel can be prevented from being increased, so that the liquid crystal display device 100 can be fabricated in a micro size.

Figure 8:
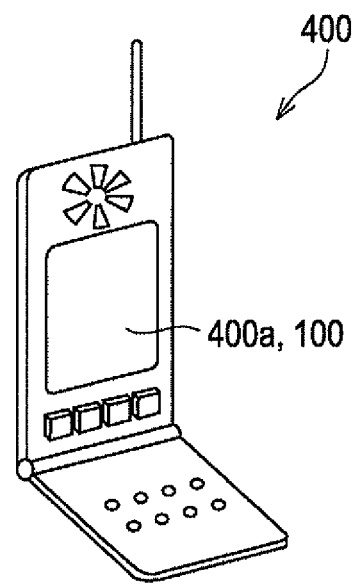
FIG. 8 is a view showing one example of an electronic apparatus using a liquid crystal display device according to one embodiment of the invention.
Figure 9:
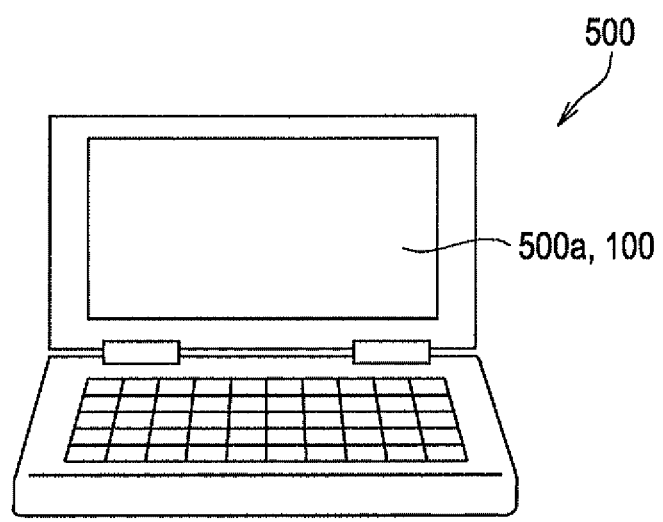
FIG. 9 is a view showing one example of an electronic apparatus using a liquid crystal display device according to one embodiment of the invention.

FIGS. 8 and 9 are views showing one example of an electronic apparatus using the liquid crystal display device according to one embodiment of the invention. Hereinafter, the electronic apparatus using the liquid crystal display device 100 according to one embodiment of the invention will be described with reference to FIGS. 8 and 9.

As shown in FIGS. 8 and 9, the liquid crystal display device 100 according to one embodiment of the invention can be applied to a cell phone 400, a PC (Personal Computer) 500 or the like. Referring to the cell phone 400 shown in FIG. 8, the liquid crystal display device 100 according to one embodiment of the invention is applied to a display screen 400*a*. Further, referring to the PC 500 shown in FIG. 9, the liquid crystal display device 100 according to one embodiment of the invention is applied to a display screen 500*a* or the like.

That is, the embodiment disclosed in the invention is for illustrative purposes only, and the invention is not limited thereto. The scope of the invention is represented by the scope of the claims other than the aforementioned embodiment, and various modifications can be made within the scope of the claims and their equivalents.

Figure 10:
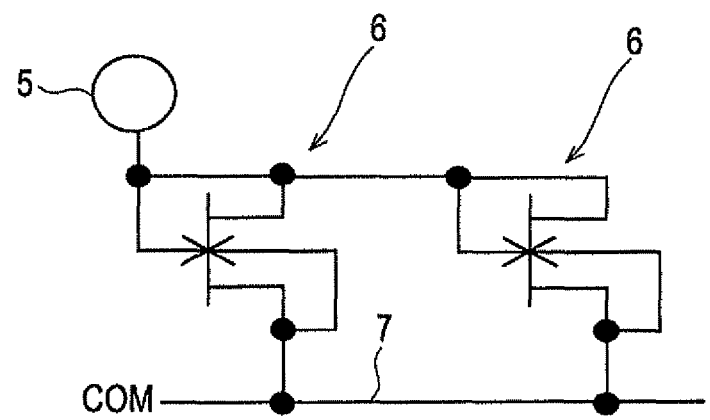
FIG. 10 is a circuit diagram showing a thin film transistor of a liquid crystal display device according to a first modification of the invention.
Figure 11:
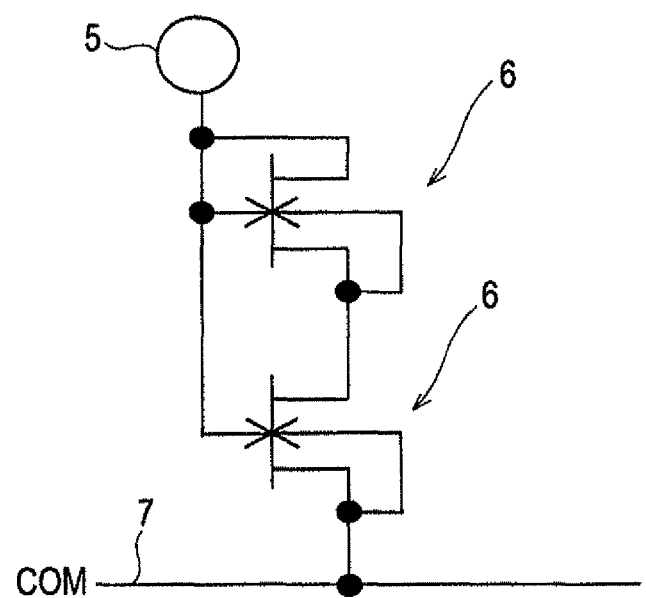
FIG. 11 is a circuit diagram showing a thin film transistor of a liquid crystal display device according to a second modification of the invention.

For example, according to the embodiment, one thin film transistor 6 serving as the diode is provided. However, the invention is not limited thereto. For example, as shown in FIG. 10, two thin film transistors 6 connected in parallel to each other to serve as the diode can be provided. Further, as shown in FIG. 11, two thin film transistors 6 serially connected to each other to serve as the diode can be provided. In addition, three or more thin film transistors 6 parallelly or serially connected to each other can be provided. Thus, from among the thin film transistors 6, although one thin film transistor 6 does not normally operate, charges accumulated on the shield electrode 31 can be discharged to the common potential via another thin film transistor 6.

Further, the embodiment shows an example in which the source electrode 55 is connected to the gate electrode 51 and the drain electrode 56 is connected to the gate electrode 52 in the thin film transistor 6 serving as the diode, so that electric current can flow from both the source electrode 55 and the drain electrode 56. However, the invention is not limited thereto. For example, electric current can flow from one of the drain electrode 56 and the shield electrode 31.

Further, the embodiment shows an example in which the thin film transistor 6 serving as the diode is provided as a switch device. However, the invention is not limited thereto. For example, switch devices other than the thin film transistor 6 serving as the diode can be provided.

Further, the embodiment shows an example in which the specific potential supplied to the shield electrode 31 via the thin film transistor 6 is used as alternating common potential. However, the invention is not limited thereto. For example, direct potential can be supplied.

Further, the embodiment shows an example in which the common potential interconnection 7 is connected to the source electrode 55 of the thin film transistor 6 serving as the diode. However, the invention is not limited thereto. For example, potential other than the common potential such as ground potential can be connected to the source electrode 55 of the thin film transistor 6.

In addition, the embodiment shows an example in which the shield electrode 31 is provided on the surface of the substrate 2 facing the substrate 1. However, the invention is not limited thereto. For example, the shield electrode 31 may be provided on the surface of an opposite side of the substrate 2 with respect to the substrate 1.

What is claimed is:

1. A liquid crystal display device comprising:
   a first substrate;
   a first thin film transistor for pixel selection formed on the first substrate;
   a pixel electrode and a common electrode formed above the first thin film transistor of the first substrate;
   a liquid crystal layer formed above the pixel electrode and the common electrode;
   a second substrate provided above the pixel electrode and the common electrode via the liquid crystal layer;
   a shield electrode formed on an entire surface of the second substrate and on a side facing the liquid crystal layer;
   a common potential interconnection that is formed on the first substrate and supplies specific AC or DC potential;
   a conducting section that is provided between the first substrate and the second substrate, and is connected to the shield electrode; and
   a switch device that is formed on the first substrate, and has a first end and a second end, the first end of the switch device being electrically connected to the shield electrode via the conducting section, the second end of the switch device being electrically connected to the common potential interconnection, wherein the switch device is turned on when a potential of the shield electrode is larger than the specific AC or DC potential of the common potential interconnection and a difference between the potential of the shield electrode and the specific AC or DC potential of the common potential interconnection is larger than predetermined potential.

2. The liquid crystal display device according to claim 1, wherein the common potential interconnection that supplies the AC or DC specific potential is an interconnection that supplies common potential to the common electrode.

3. The liquid crystal display device according to claim 1, wherein the shield electrode is provided on the second substrate facing the first substrate.

4. The liquid crystal display device according to claim 1, wherein the switch device includes a second thin film transistor having an active layer identical to an active layer of the first thin film transistor.

5. The liquid crystal display device according to claim 4, wherein the second thin film transistor has a source electrode, a drain electrode and two gate electrodes, and one of the source electrode and the drain electrode of the second thin film transistor is electrically conductive with the shield electrode, and
   one of the source electrode and the drain electrode of the second thin film transistor is connected to one of the gate electrodes of the second thin film transistor, and the other of the source electrode and the drain electrode of the second thin film transistor is connected to the other of the gate electrodes of the second thin film transistor.

6. The liquid crystal display device according to claim 1, wherein the first substrate has a display area provided with a plurality of pixels and a non-display area other than the display area, and
the switch device is provided in the non-display area.

7. The liquid crystal display device according to claim 1, further comprising a seal member that seals the first and second substrates such that the liquid crystal layer is interposed between the first and second substrates, wherein the switch device overlaps the seal member when seen in plan view.

8. The liquid crystal display device according to claim 7, further comprising:
an interconnection layer that connects the conducting section to the first end of the switch device via an electrode,
wherein the conducting section and the interconnection layer overlap the seal member when seen in plan view.

9. The liquid crystal display device according to claim 1, wherein the switch device is a first switch device, and further comprising a second switch device that is connected to the first switch device in series or in parallel.

10. An electronic apparatus comprising the liquid crystal display device according to claim 1.

* * * * *